N. F. AMBURSEN.
APPARATUS FOR CONSTRUCTING CONCRETE FLOORS AND WALLS.
APPLICATION FILED APR. 17, 1918.

1,292,986.

Patented Feb. 4, 1919.
6 SHEETS—SHEET 2.

Inventor:
Niels Frederick Ambursen
by Fredk. Woodworth
atty.

N. F. AMBURSEN.
APPARATUS FOR CONSTRUCTING CONCRETE FLOORS AND WALLS.
APPLICATION FILED APR. 17, 1918.

1,292,986.

Patented Feb. 4, 1919.
6 SHEETS—SHEET 5.

Inventor:
Nils Frederick Ambursen
by Geo. K. Woodworth
Atty.

N. F. AMBURSEN.
APPARATUS FOR CONSTRUCTING CONCRETE FLOORS AND WALLS.
APPLICATION FILED APR. 17, 1918.

1,292,986.

Patented Feb. 4, 1919.
6 SHEETS—SHEET 6

Inventor:
Niels Frederick Ambursen
By Geo. K. Woodworth
Atty

UNITED STATES PATENT OFFICE.

NILS FREDERICK AMBURSEN, OF NEWTON, MASSACHUSETTS, ASSIGNOR TO THE UNIFORM COMPANY, OF BOSTON, MASSACHUSETTS, A CORPORATION OF MASSACHUSETTS.

APPARATUS FOR CONSTRUCTING CONCRETE FLOORS AND WALLS.

1,292,986.  Specification of Letters Patent.  Patented Feb. 4, 1919.

Application filed April 17, 1918. Serial No. 259,138.

*To all whom it may concern:*

Be it known that I, NILS F. AMBURSEN, a citizen of the United States, and a resident of Newton, in the county of Middlesex and State of Massachusetts, have invented a new and useful Improvement in Apparatus for Constructing Concrete Floors and Walls, of which the following is a specification.

My invention relates to apparatus for constructing concrete floors and walls and its principal object is to provide such apparatus which can be used interchangeably for these purposes.

With this object in view my invention contemplates the use of laterally-spaced concrete-form support-members, preferably metallic channels, arranged vertically for wall construction and horizontally for floor construction, and sheet-metal forms, preferably having plane surfaces, placed between each pair of adjacent channels and abutting the flanges of the same, said channels being constructed and arranged to be reversed in position with respect to said forms and the surface of each said form being flush with one of the surfaces of the contiguous channels in either position of the latter so that the surface of the forms and one or more of the surfaces of the channels will form a continuous mold for receiving the concrete, together with means for temporarily securing the forms and channels together, or preventing relative movement between the same.

Several embodiments of my invention are shown in the accompanying drawings in which—

Fig. 4ᵃ is a fragmentary vertical section taken on the line 4ᵃ—4ᵃ of Fig. 4.

The salient feature of my invention consists in the employment of concrete forms and support members therefor adapted to be used interchangeably for making molds for walls or floors and so constructed and arranged that the surface of the forms and one or more surfaces of the support members constitute a continuous mold for the concrete. The support members are shown in the present instance as metallic channels 1 which are spaced laterally to receive the mold members between each pair thereof, said channels being arranged vertically as shown in Figs. 4 and 16 for wall construction and horizontally as shown in Figs. 9, 10, 17 and 18 for floor construction. Inasmuch as the surface of the forms must be flush with the outer surface of the web of the channels (Figs. 1, 9 and 14) or with the surfaces of the ends of the flanges thereof (Figs. 3, 10 and 15) it is desirable to secure attaching members to the sides of the forms instead of forming such members integral therewith, although my invention does not exclude forms provided with integrally-formed attaching members. In the present instance the forms 2 consist as shown of plane sheet-metal channels the ends of which are provided with flanges 3 bent at right angles thereto for the purpose of stiffening the same.

Figure 1:
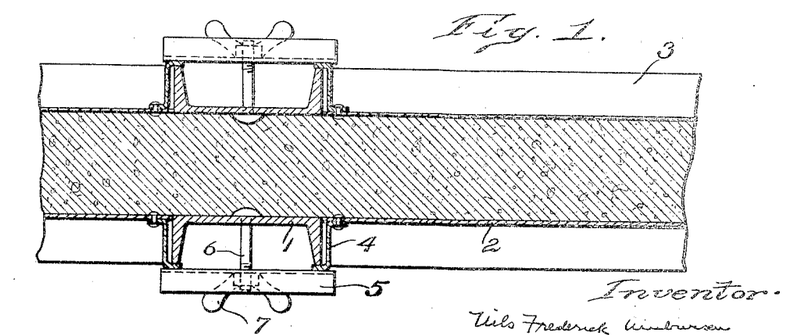
Figure 1 is a horizontal section taken on the line 1—1 of Fig. 4 of my improved apparatus showing the use thereof for constructing a wall having two parallel surfaces.
Figure 14:
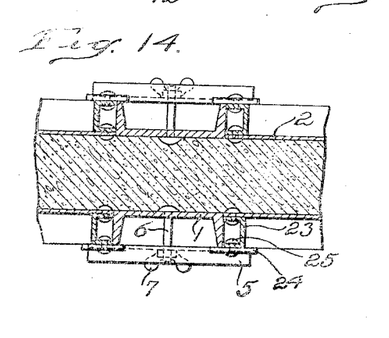
Fig. 14 is a horizontal section taken on the line 14—14 of Fig. 16, said section being similar to that shown in Fig. 1 and illustrating a different means for preventing relative movement between the mold members.

Suitably secured to the sides of the forms by riveting as illustrated or preferably by spot-welding are attaching members shown by way of example as Z-irons 4 in Figs. 1, 2 and 3 and as channels 23 in Figs. 14 and 15, said attaching members being hereinafter referred to generically as angle-irons. The lower ends of the Z-irons extend over the flanges of the channels 1 in the arrangement shown in Fig. 1 and a member 5 herein shown as a light channel apertured to receive the headed bolt 6 which passes through the web thereof serves as a clamp to temporarily secure the mold members together, a wing nut 7 being shown in the present instance as threaded to the outer end of said bolt. In this case the surface of each form is flush with the outer surface of the webs of each channel 1 and here as in every arrangement the ends of each form abut the flanges of its contiguous channels, whereby a continuous mold is built up by the channels and forms.

Figure 2:
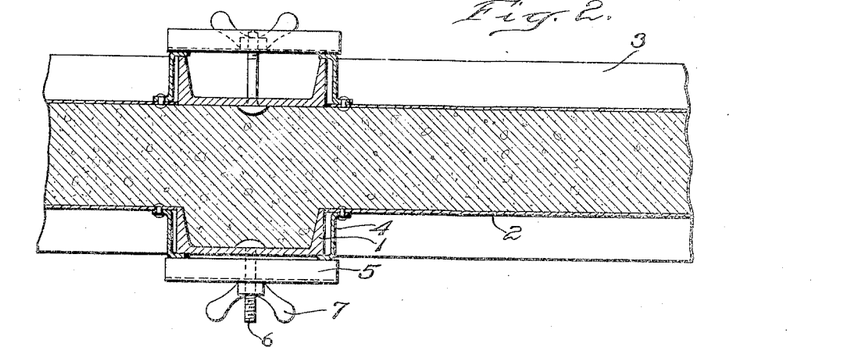
Fig. 2 is a similar section showing an arrangement of said apparatus for constructing a wall having a series of pilasters on one face thereof.

If it is desired to construct a wall having a series of pilasters on one face thereof, one set of channels is reversed as shown in Fig. 2, and in such case the surface of each form is flush with the inner ends of the flanges so that the inner surfaces of said flanges and the inner surface of the webs of said channels constitute portions of the mold for forming the pilasters.

Figure 3:
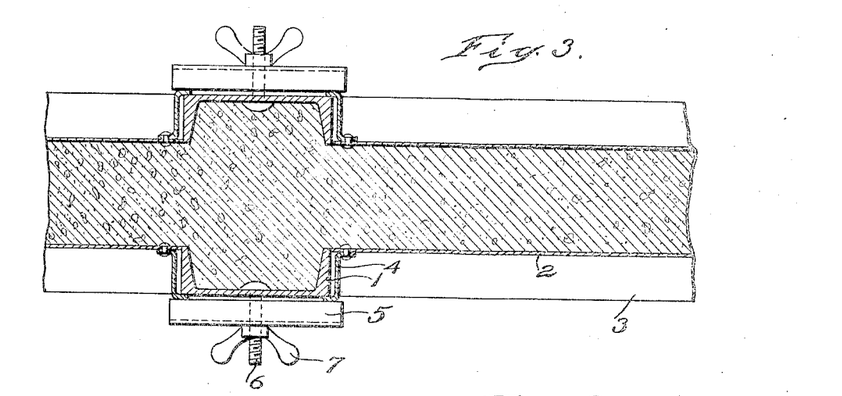
Fig. 3 is a similar section of another arrangement for constructing a wall having a series of pilasters on both faces thereof.
Figures 4, 4A, 5, 6:
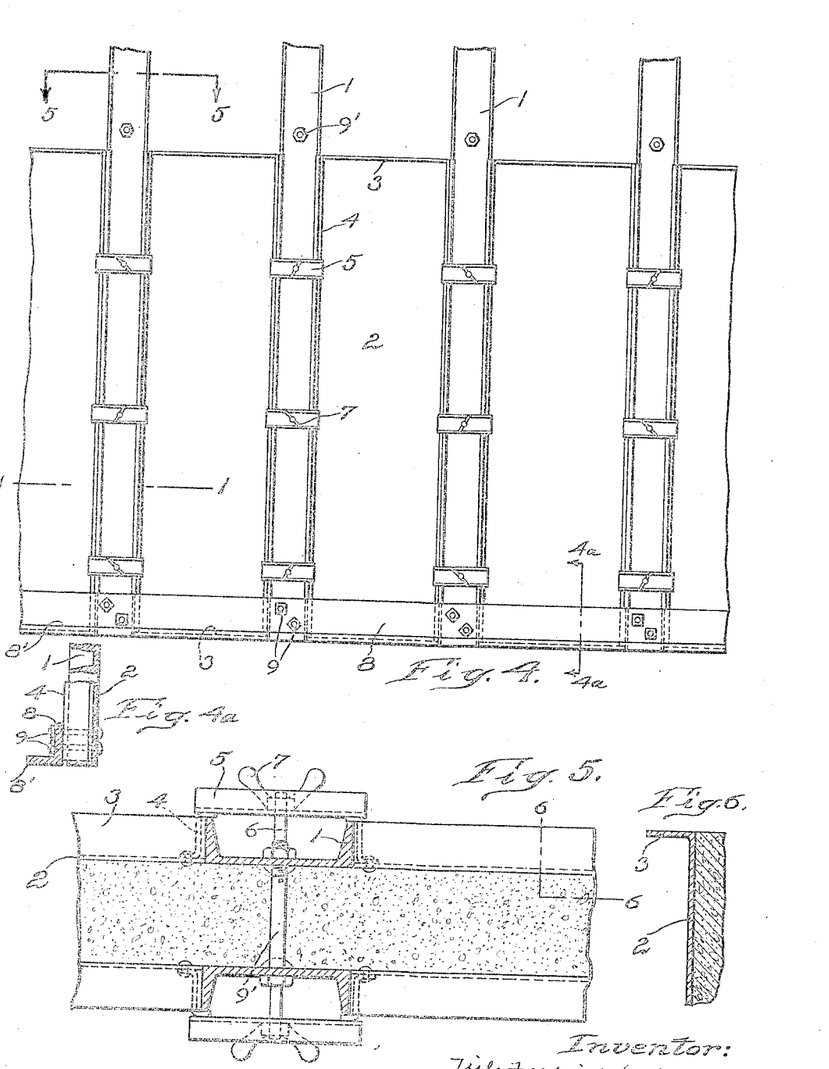
Fig. 4 is an elevation showing one way of supporting the channels and forms vertically for molding walls.
Fig. 5 is a horizontal section taken on the line 5—5 of Fig. 4.
Fig. 6 is a fragmentary section taken on the line 6—6 of Fig. 5.

As shown in Fig. 3 both channels may be arranged so that the inner surfaces of their flanges and webs form portions of the mold for constructing a wall having a series of pilasters on each face thereof.

Various means may be employed for supporting the mold members vertically for wall construction. A simple arrangement is shown in Fig. 4 and consists essentially of means such as the angle-iron 8 having a flange 8' bolted as shown at 9 to the lower ends of each set of the vertically-arranged laterally-spaced channels. Bolts 9' are passed through the apertures in the channels above the first section of the wall to be molded as shown in Fig. 5 to prevent the channels from spreading outwardly. Suitable separators (not shown) are then placed between the upper ends of the two sets of channels to hold the latter apart until the first section of the wall has been molded.

After the channels have been placed in position and suitably secured in the manner above described, the forms are arranged between each pair of adjacent channels with the outer ends of the Z-irons extending over the flanges thereof and the wing-nuts tightened to clamp the mold members together.

The mold so constructed is then filled with concrete to form the first section of the wall and after the concrete has set the wing-nuts are loosened, the clamps 5 turned about the bolts 6 to release the ends of the Z-irons, the forms taken down and the bolts 9' removed. The forms are then re-assembled higher up on the channels to make the mold for the second section of the wall, the bolts 6 of the lowermost clamp passing through the holes in which the bolts 9' were arranged while the first section was being poured, and said bolts 9' being placed through holes in the channels above the second section. This process is repeated until the required height has been reached.

Figure 7:
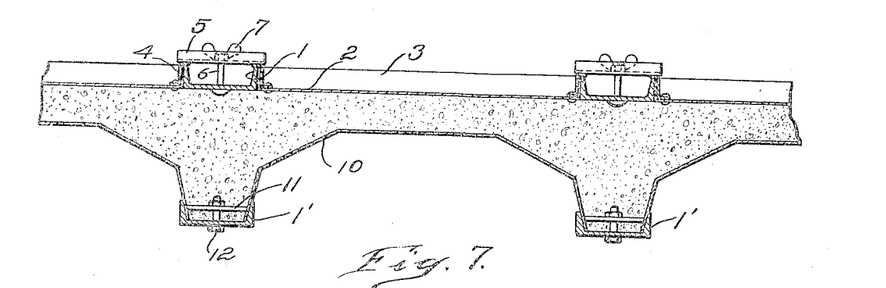
Fig. 7 is a horizontal section similar to those shown in Figs. 1, 2 and 3 and illustrating a modification.
Figure 8:
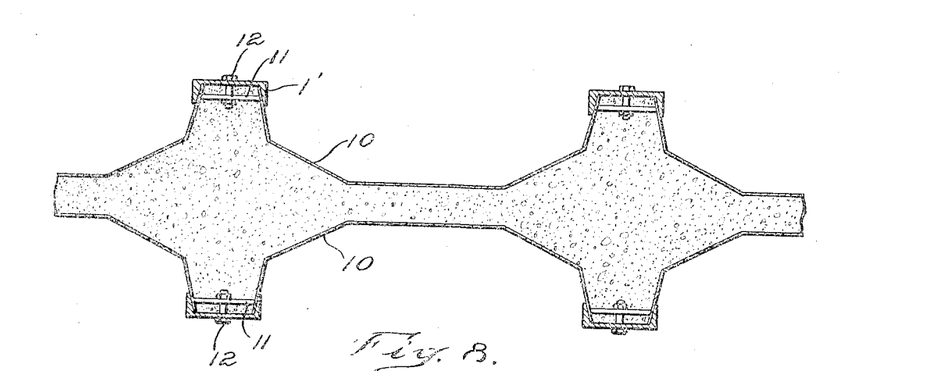
Fig. 8 is a similar horizontal section of a further modification.

In Fig. 7 I have shown how the arch-plates 10 described in my Letters Patent 1,216,644, February 20, 1917, may be used in conjunction with the plane forms 2 and their coöperating channels to make a mold for a wall having a series of pilasters on one face thereof, suitable wire lathing being secured if desired to the outer faces of the pilasters and covered with cement or plaster for the purpose of forming a wall having air spaces in the usual well known manner. In this case the clamping member 11 and bolt 12 serve to hold the lower edges of the arch plates against the flanges of the channels 1'. In Fig. 8 two sets of said arch-plates and channels are used, each element of one set being opposite a corresponding element of the other set, whereby a mold is formed for a wall having pilasters on both faces thereof. By wire-lathing and plaster a wall having two opposed series of air spaces may be constructed.

Figure 9:
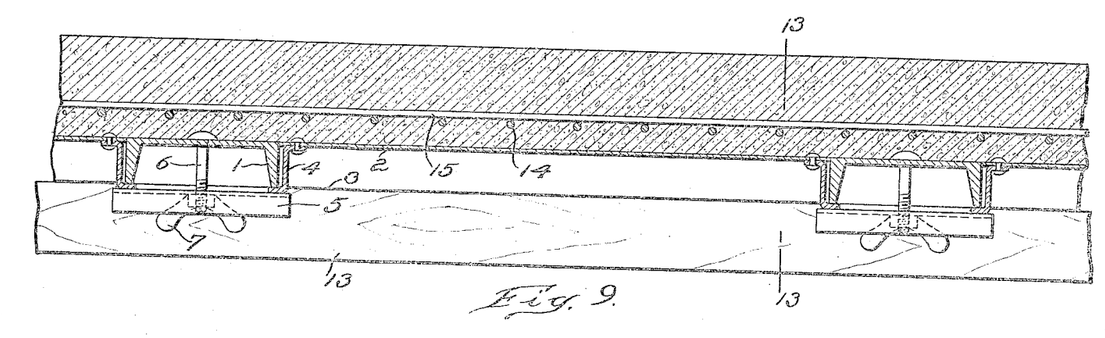
Fig. 9 is a vertical section showing the forms and channels arranged horizontally for constructing a flat-slab floor.

In order to use the plane forms for making flat-slab floors, the channels are supported on stringers 13 as shown in Fig. 9, said forms clamped thereto as above set forth, and reinforcing members such as the rods 14 and 15 suitably arranged above the mold. It will be noted that in this arrangement the sides of the forms abut the flanges of the contiguous channels and that the surfaces of the forms are flush with the upper surfaces of the webs of the channels.

Figure 10:
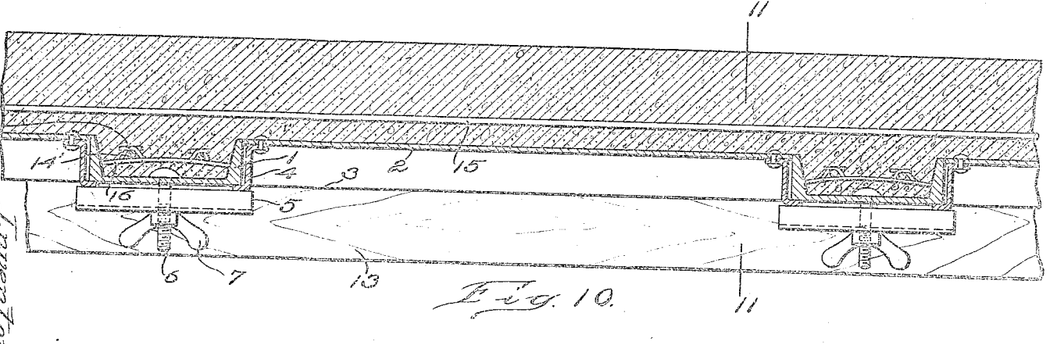
Fig. 10 is a similar section showing the arrangement of the parts for molding a floor having reinforced concrete ribs formed integral therewith.

By reversing the positions of the channels in the manner shown in Fig. 10 floors having ribs formed integral therewith may be constructed. A convenient means for supporting and spacing the reinforcing members 14' of said ribs consists of a member 16 the ends of which rest against the flanges of the channel and which is provided with two pairs of prongs 17 struck from the same in the direction of its length, the members of each pair of prongs being arranged to be bent over a rod placed therebetween. It will be noted that said channels 1 are of such depth that the reinforcing members 14' are partially or wholly below the adjacent plane surfaces of the forms 2, so that the effective depth of the floor, i. e., the distance between the center of reinforcement and the top of the floor, may be increased and the rods, not being in contact, may both be surrounded by concrete.

The means which I prefer for supporting the mold members arranged in the manner shown in Figs. 9 and 10 consist of a cap 18 secured to the top of a post 19 and carrying the stringers 13 upon which the end of the channels rest, suitable wedges 20 being interposed between said stringers and the cap of said post for adjusting the vertical position of the channels.

Figures 11, 12:
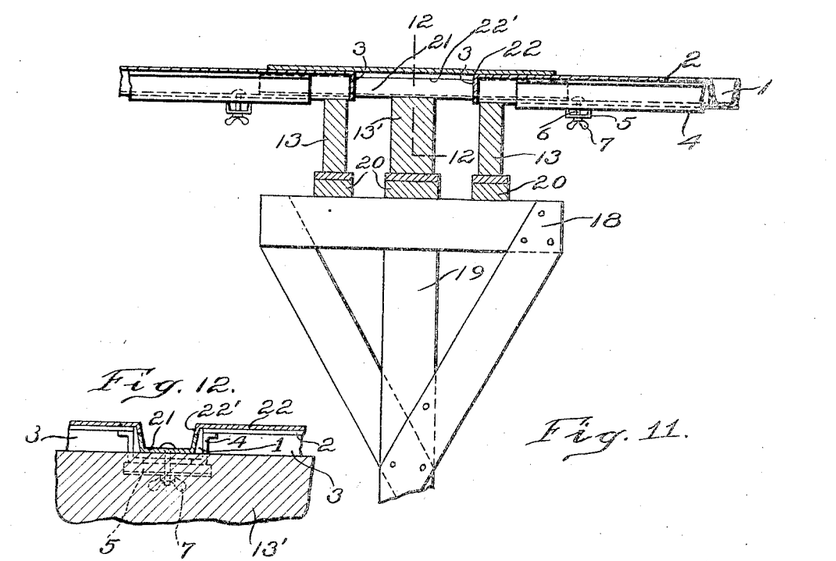
Fig. 11 is a section taken on the line 11—11 of Fig. 10 showing the mold before the reinforcing rods are placed in position or the concrete poured.
Fig. 12 is a section taken on the line 12—12 of Fig. 11.
Figure 13:
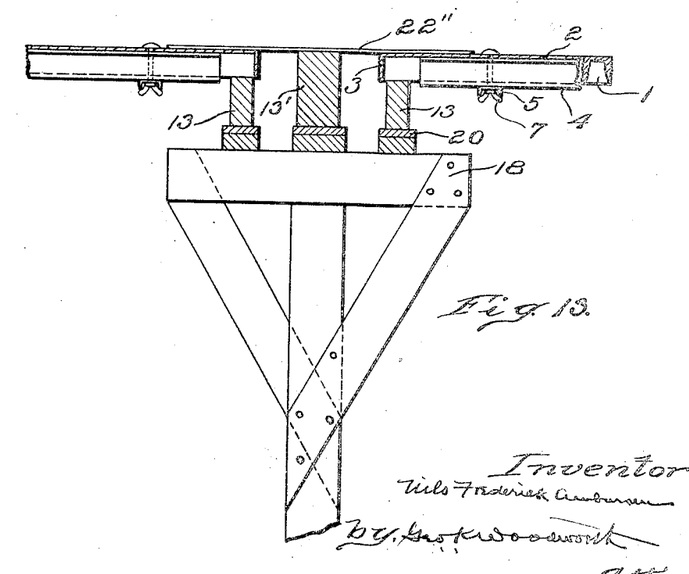
Fig. 13 is a section taken on the line 13—13 of Fig. 9 showing the mold before the reinforcing rods are placed in position or the concrete poured.

As shown in Figs. 11 and 12 a thin metallic channel 21 may be used to bridge the gaps between adjacent channels 1 and cover plates 22 to bridge the gaps between the forms, the flanged ends 22' of said plates meeting the upper edges of the flanges of the bridging channels. In the arrangement shown in Fig. 13 a cover plate 22'' bridges the gap between the forms. The bridging channel 21 and cover plates 22'' rest upon the stringers 13' so that after the concrete has set but before it has thoroughly hardened the channels 1 and the forms 2 may be removed and the floor supported by the stringers 13', the channels 21 and the cover plates 22 (Fig. 11) or by said stringers and the cover plates 22'' (Fig. 13).

Preferably the Z-irons 4 or other attaching members do not extend up to the inner ends of the channels 1 which rest directly on the stringers 13 so that after the concrete has set but before it has thoroughly hardened the forms 2 may be taken down without disturbing said channels by loosening the wing-nuts and turning the clamps 5 about their respective bolts 6 to release the lower ends of the attaching members. The floor will then be supported by the channels 1 as well as the cover plates and bridging channels. The channels may then be removed after the concrete has further hardened.

Figure 15:
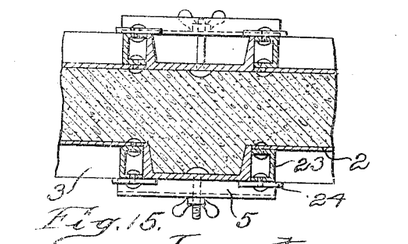
Fig. 15 is a section similar to that shown in Fig. 2 and illustrating the said means for preventing relative movement between the mold members.
Figure 16:
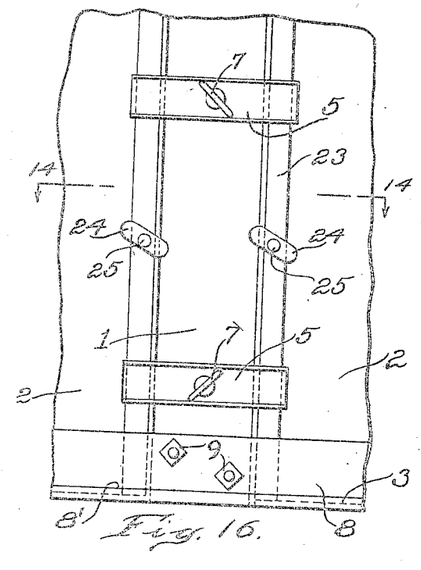
Fig. 16 is a fragmentary elevation illustrating one arrangement for supporting the apparatus shown in Fig. 14 to form a wall mold.
Figure 17:
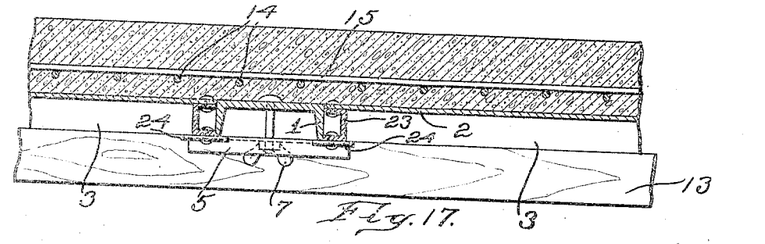
Figs. 17 and 18 are horizontal sections similar to those shown in Figs. 9 and 10, respectively, and illustrating the arrangement of the apparatus shown in Figs. 14 and 15 when used for constructing floors.
Figure 18:
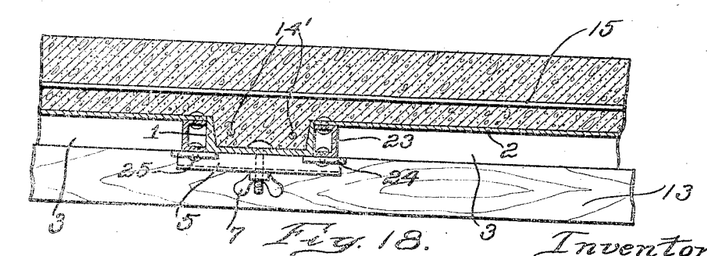

In Figs. 14 to 18 inclusive I have illustrated the use of another type of concrete-form attaching-member consisting of channel-shaped members 23 each having one flange riveted or spot-welded to the sides of the forms and the ends of both flanges arranged to abut the outer sides of the flanges of the contiguous channels 1 when the forms are secured to the latter. Swiveled at 25 to the lower flange of each channel 23 is a latch 24 arranged to take under the ends of the flanges of the channels, respectively, (Figs. 14, 16 and 17) or under the outer face of the web of said channels (Figs. 15 and 18). As will be obvious the clamping members 5 prevent the forms from moving outwardly in the case of a wall mold or downwardly in a floor mold, while the latches prevent the movement of said forms in the opposite directions.

Figure 19:
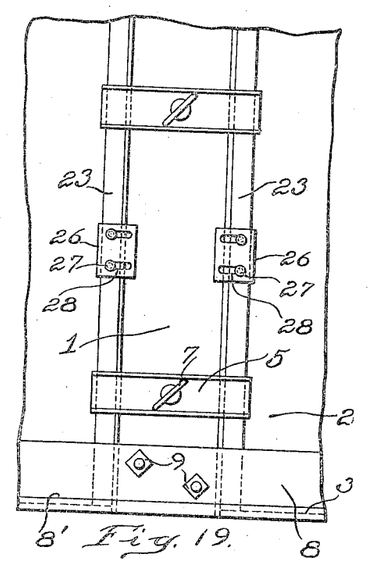
Fig. 19 is a fragmentary elevation corresponding to Figs. 4 and 16 and showing a further modification.

In Fig. 19, I have shown another type of latch consisting of the sliding piece 26, movably secured to the outer flange of the channel 23 by headed bolts 27 which pass through slots 28 therein and arranged when in the position shown to project across the flanges of channels 1, thereby preventing the forms 2 from moving inwardly.

Having thus described various illustrative embodiments of my invention without however limiting the same thereto what I claim and desire to secure by Letters Patent is:

1. Interchangeable apparatus for constructing concrete floors and walls comprising laterally-spaced channels, plane forms placed between each pair of adjacent channels and abutting the flanges of the same, said channels being constructed and arranged to be reversed in position with respect to said forms, and the surface of each said form being flush with one of the surfaces of the contiguous channels in either position of the latter, and means attached to said channels and forms for preventing relative movement therebetween.

2. Interchangeable apparatus for constructing concrete floors and walls comprising laterally-spaced channels, plane forms placed between each pair of adjacent channels and abutting the flanges of the same, said channels being constructed and arranged to be reversed in position with respect to said forms and the surface of each said form being flush with one of the surfaces of the contiguous channels in either position of the latter, and means attached to said channels and forms for temporarily securing the same together.

3. Interchangeable apparatus for constructing concrete floors and walls comprising laterally-spaced channels, plane forms placed between each pair of adjacent channels and abutting the flanges of the same, said channels being constructed and arranged to be reversed in position with respect to said forms and the surface of each said form being flush with one of the surfaces of the contiguous channels in either position of the latter, and means for clamping said forms to said channels.

4. Interchangeable apparatus for constructing concrete floors and walls comprising laterally-spaced channels, plane sheet-metal forms placed between each pair of adjacent channels and abutting the flanges of the same, said channels being constructed and arranged to be reversed in position with respect to said forms and the surface of each said form being flush with one of the surfaces of the contiguous channels in either position of the latter, attaching members permanently fixed to the sides of said forms, and means temporarily fixed to said channels and arranged to coöperate with said attaching members for securing said forms and channels together.

5. Interchangeable apparatus for constructing concrete floors and walls comprising laterally-spaced channels, plane sheet-metal forms placed between each pair of adjacent channels and abutting the flanges of the same, said channels being constructed and arranged to be reversed in position with respect to said forms and the surface of each said form being flush with one of the surfaces of the contiguous channels in either position of the latter, angle-irons permanently attached to the sides of said forms, and a clamping member bolted to said channels for coöperating with said angle-irons.

6. Interchangeable apparatus for constructing concrete floors and walls comprising laterally-spaced channels, plane forms placed between each pair of adjacent channels and abutting the flanges of the same, the surface of each said form being flush with one of the surfaces of the contiguous channels, angle-irons permanently attached to the sides of said forms, members bolted to said channels for coöperating with said angle-irons, and a latch swiveled to each said angle-iron and arranged to coöperate with a channel.

7. Interchangeable apparatus for constructing concrete floors and walls comprising laterally-spaced channels, plane forms placed between each pair of adjacent channels and abutting the flanges of the same, the surface of each said form being flush with one of the surfaces of the contiguous channels, angle-irons permanently attached to the sides of said forms, members bolted to said channels for coöperating with said angle-irons, and a latch movably attached to each said angle-iron and arranged to coöperate with a channel.

8. Interchangeable apparatus for constructing concrete floors and walls comprising two sets of laterally-spaced channels, the members of one set being arranged opposite the respective members of the other set, plane forms arranged between each pair of the adjacent channels of each set and abutting the flanges of the same, said channels being constructed and arranged to be reversed in position with respect to said forms and the surface of each said form being flush with one of the surfaces of the contiguous channels in either position of the latter, and means attached to said channels and forms for preventing relative movement therebetween.

9. Interchangeable apparatus for constructing concrete floors and walls comprising two sets of laterally-spaced channels, the members of one set being arranged opposite the respective members of the other set, sheet-metal forms arranged between each pair of the adjacent channels of each set, said channels being constructed and arranged to be reversed in position with respect to said forms and means attached to said channels and forms for preventing relative movement therebetween.

10. Interchangeable apparatus for constructing concrete floors and walls comprising laterally-spaced channels, plane forms placed between each pair of adjacent channels and abutting the flanges of the same, said channels being constructed and arranged to be reversed in position with respect to said forms and the surface of each form being flush with the outer surface of the web of each channel, whereby said surfaces form a continuous mold, and means secured to said channels and forms for preventing relative movement therebetween.

11. Interchangeable apparatus for constructing concrete floors and walls comprising laterally-spaced channels, plane forms placed between each pair of adjacent channels and abutting the flanges of the same, said channels being constructed and arranged to be reversed in position with respect to said forms and the surface of each form being flush with the inner ends of said flanges, whereby the inner surfaces of said flanges and the inner surface of the web of each channel form portions of the mold, and means secured to said channels and forms for preventing relative movement therebetween.

12. Interchangeable apparatus for constructing concrete floors and walls comprising laterally-spaced channels, forms arranged between each pair of adjacent channels, angle-irons permanently attached to the sides of said forms, members bolted to said channels for coöperating with said angle irons, and a latch swiveled to each said angle-iron and arranged to coöperate with a channel.

13. Interchangeable apparatus for constructing concrete floors and walls comprising laterally-spaced channels, forms arranged between each pair of adjacent channels, angle-irons permanently attached to the sides of said forms, members bolted to said channels for coöperating with said angle-irons, and a latch movably attached to each said angle-iron and arranged to coöperate with a channel.

14. Apparatus for constructing concrete floors comprising laterally-spaced channels, plane forms placed between each pair of adjacent channels and abutting the flanges of the same, said channels being constructed and arranged to be reversed in position with respect to said forms and the surface of each form being flush with the inner ends of said flanges, whereby the inner surfaces of said flanges and the inner surface of the web of each channel form portions of the mold, said channels being of such depth that reinforcing rods placed therein may be partially or wholly below the adjacent plane surfaces of said forms, and means secured to said channels and forms for preventing relative movement therebetween.

15. Interchangeable apparatus for constructing concrete floors and walls comprising laterally spaced channels, plane forms placed between each pair of adjacent channels and abutting the flanges thereof, said channels being constructed and arranged to be reversed in position with respect to said forms and the surface of each said form being flush with one of the surfaces of the contiguous channels in either position of the latter, and means for preventing relative movement between said forms and channels.

In testimony whereof I have hereunto subscribed my name this 11th day of April, 1918.

NILS FREDERICK AMBURSEN.